(12) United States Patent
Haag et al.

(10) Patent No.: US 7,507,077 B1
(45) Date of Patent: Mar. 24, 2009

(54) SELF-LOCKING TIRE BLADE SYSTEM

(75) Inventors: Tom Haag, Atwater, OH (US); Terry Ellis, Wadsworth, OH (US)

(73) Assignee: Acro Tool & Die Company, Akron, OH (US)

( * ) Notice: Subject to any disclaimer, the term of this patent is extended or adjusted under 35 U.S.C. 154(b) by 226 days.

(21) Appl. No.: 11/634,467

(22) Filed: Dec. 6, 2006

(51) Int. Cl.
*B29C 35/02* (2006.01)

(52) U.S. Cl. .................. 425/28.1; 425/193; 425/472

(58) Field of Classification Search ............. 425/28.1, 425/35, 46, 193, 470, 472
See application file for complete search history.

(56) References Cited

U.S. PATENT DOCUMENTS

| | | | |
|---|---|---|---|
| 2,224,337 A | | 12/1940 | Bostwick |
| 2,284,000 A | * | 5/1942 | Kraft .......................... 29/515 |
| 2,756,460 A | * | 7/1956 | Heintz, Jr. .................. 425/28.1 |
| 4,543,050 A | | 9/1985 | Takahashi et al. |
| 5,247,151 A | | 9/1993 | Hagerman |
| 6,138,982 A | * | 10/2000 | Bellot .......................... 249/91 |
| 6,827,566 B1 | | 12/2004 | Root et al. |

* cited by examiner

*Primary Examiner*—James Mackey
(74) *Attorney, Agent, or Firm*—Renner, Kenner, Greive, Bobak, Taylor & Weber

(57) ABSTRACT

A tire blade system for curing tires including a tire mold defining at least one slot, the slot defining a first recess and a second recess spaced by a bridge, the walls of the first and second recess being straight; a blade including a body exposed within the tire mold and an attachment assembly received in the slot, the attachment assembly including a first and a second prong spaced by a notch; and wherein the first prong includes a engaging edge and the second prong including an undercut edge, and when the blade is inserted into the slot, the engaging edge deflects the bridge toward the undercut edge to resiliently hold the blade in the slot.

15 Claims, 4 Drawing Sheets

SELF-LOCKING TIRE BLADE SYSTEM

The present invention generally relates to tire mold systems. In particular, the present invention relates to a blade attached within a tire mold to form a sipe. Most particularly, the present invention relates to a self-locking tire blade system including a blade having an attachment assembly that fits into a receiver formed in a tire mold, where the attachment assembly includes a surface that deforms the receiver upon insertion to secure the blade within the mold.

BACKGROUND OF THE INVENTION

Tire molds often incorporate blades to form slots or grooves in the tread of a tire. These slots and grooves are typically referred to as sipes. The blades are typically thin metal strips of various lengths. The strips are typically straight but may include one or more bends and/or arcs depending on the shape of the sipe to be formed by the blade.

To mount the blade within a machined tire mold, slots are machined into the tire mold and the blade is inserted into the slots. Typically, the slot has a uniform depth and extends the entire length of the blade to provide the greatest amount of surface area for application of an adhesive, such as epoxy, to hold the blade within the slot. Since a single tire mold may include hundreds of slots, the time required to machine the slots is significant. Also, the labor involved in applying an adhesive to each blade before insertion is extensive. To that end, a self-locking blade has been recently developed to secure the blade within a slot without the need for the time consuming step of applying epoxy to the blade. The self-locking blade includes self-locking structures that expand outwardly to create an interference fit within the mold. To that end, grooves are formed in the tire mold to receive the self-locking structures. To allow the self-locking structure to expand, these grooves are undercut such that they have a trapezoidal profile with a base that is wider than the top opening of the groove, and sidewalls that slope inwardly from the base to the opening.

The self-locking structures include tendons that extend downward from the base of the blade. The tendons generally have a split configuration with a center portion that joins the split halves of the tendon and extends downward from the tendons. The tendons initially have a width less than the top opening within the groove to allow them to be easily inserted. To secure the blade, the blade is tapped with a hammer to collapse the center portion forcing it inward between the split halves. The collapsing center portion forces the split halves outward to fill the undercut portions of the groove.

While this blade improved over the prior method of securing blades with epoxy, the machining of the undercut grooves requires a five axis machine. Forming this undercut becomes even more difficult when using electric discharge machining (EDM). The use of EDM is attractive because of the speed with which slots may be formed using this technique. Therefore, a self-locking blade that does not require formation of an undercut groove within the tire mold is desirable.

Tire molds may also be constructed by casting the mold. In this process, the blades are attached by forming the mold around the blade. To that end, during the casting process, the blades are held in a pattern, and then molten mold material flows around the base of the blade. Taking advantage of this process, blades used in cast molds include notches on the side of the blade base below the top surface of the mold so that the molten material flows into these notches and positively stops the blade from being pulled out. It will be appreciated that this type of blade cannot be used in a machined slot. Therefore, it is desirable to have a self-locking blade that can be used in both a machined mold and a cast mold.

SUMMARY OF THE INVENTION

The present invention generally provides a tire blade that defines a notch in which a bridge within the tire mold is received. One side of the notch defines an undercut and the opposite side is adapted to engage the bridge and deform the bridge into the undercut portion of the notch.

The present invention also provides a method of attaching a blade within a slot including the steps of providing a blade having a notch with an undercut on one side of the notch; forcing a portion of the mold into the undercut portion of the notch by inserting the blade into the slot.

The present invention also provides a tire blade system including a tire mold defining at least one slot, the slot defining a first recess and a second recess spaced by a bridge, the walls of the first and second recess being straight; a blade including a body exposed within the tire mold and an attachment assembly received in the slot, the attachment assembly including a first and a second prong spaced by a notch; and wherein the first prong includes a engaging edge and the second prong including an undercut edge, and when the blade is inserted into the slot, the engaging edge deflects the bridge toward the undercut edge to hold the blade in the slot.

The present invention also provides a blade for attachment to a tire mold including a body; a first prong and a second prong extending from a bottom edge of the body and defining a notch therebetween, the first prong including an engaging edge, facing the second prong and the second prong including an undercut edge, facing the first prong, the engaging edge and the undercut edge being generally parallel and oriented other than perpendicular to the bottom edge.

The present invention also provides a self-locking tire blade system including a tire blade having an attachment assembly extending from a base of the tire blade, wherein the attachment assembly includes at least one prong, a tire mold having a receiver, the receiver defining a recess corresponding to the prong, and wherein the attachment assembly has a surface adapted to deform the receiver upon insertion to create an interference fit between the tire blade and the tire mold.

DETAILED DESCRIPTION OF THE INVENTION

Figure 1:
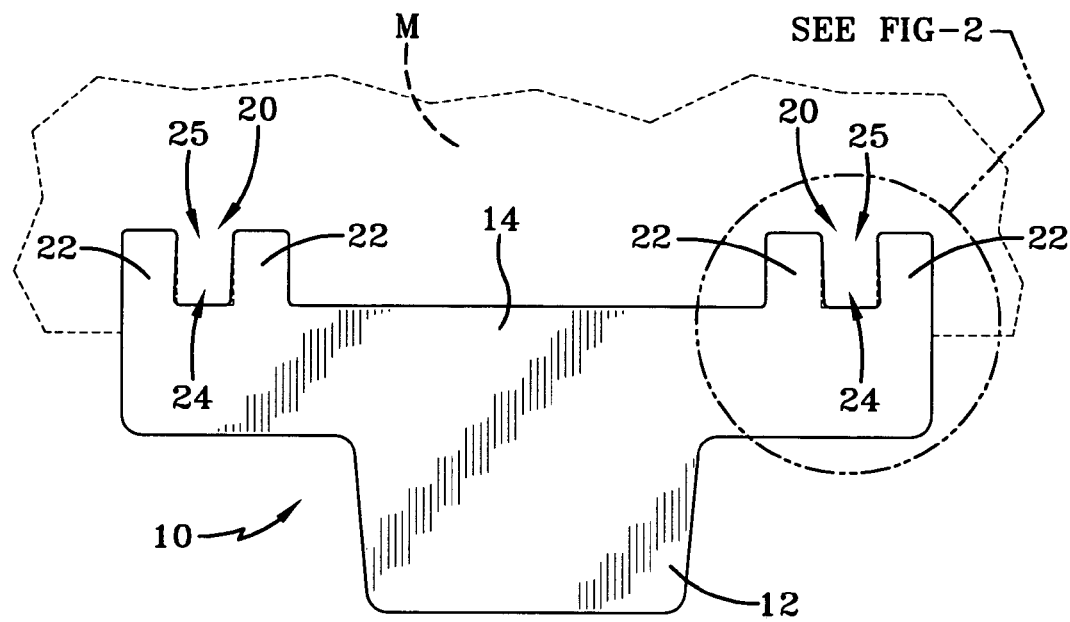
FIG. 1 is a front elevational view of a tire blade according to the concepts of the present invention.

A tire mold blade according to the concepts of the present invention is generally referred to by the number 10 in the accompanying drawings. Referring to FIG. 1, blade 10 is generally a thin member that is attached to a tire mold M. Blade 10 may be formed of a variety of materials including, for example, and without limitation, steel, stainless steel, aluminum, and Inconel®. It will be appreciated that other materials may be used as long as they are capable of withstanding the tire molding process.

Figure 2:
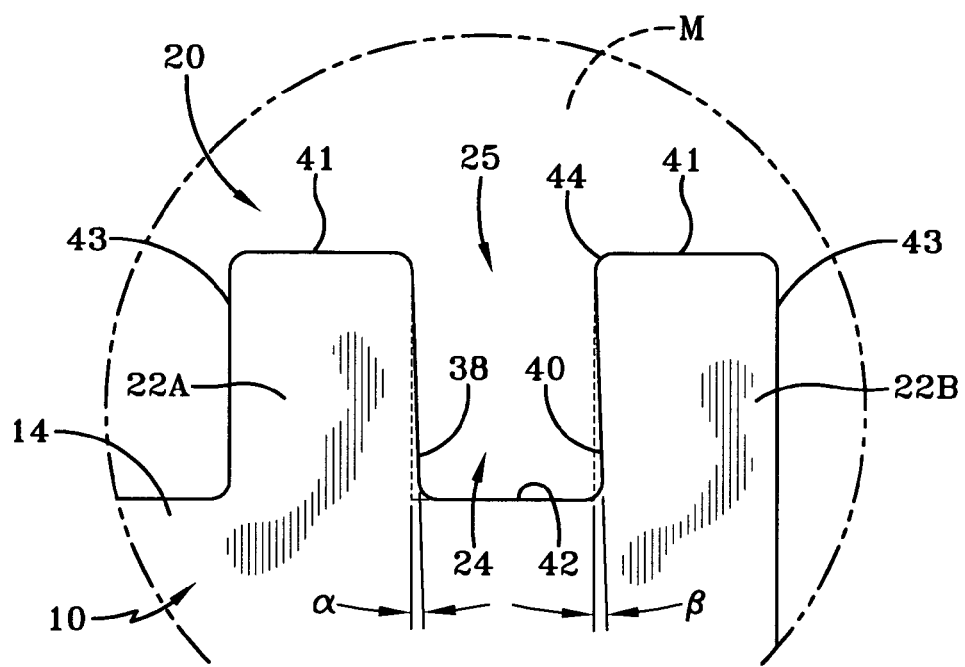
FIG. 2 is an enlarged front elevational view of the area indicated in FIG. 1 to show details of an attachment assembly formed on the blade.

Blade 10 includes a body 12 that is exposed within tire mold M to form a sipe within the finished tire. To attach blade 10, an attachment assembly, generally indicated by the number 20 is provided at the base 14 of blade 10. As best shown in FIG. 2, attachment assembly 20 may include at least one prong 22 that extends outward from base 14 of blade 10 toward tire mold M. As shown, attachment assembly may include a pair of prongs 22, where the first and second prongs define a notch 24 for receiving a bridge formed in tire mold M, as will be described more completely below. Prongs 22 may have any shape including for example, the rectangular shape shown. Also, the outward edge of prong 22 may be square. In general prongs 22 have a width less than the length of blade 10.

As shown in FIG. 1, blade 10 may include more than one attachment assembly 20. Since longer blades are subjected to forces over a larger area and are able to accommodate more attachment assemblies 20, the number of attachment assemblies 20 used typically will be determined by the length of the blade. In the example shown, two attachment assemblies 20 are located at opposite ends of a blade 10. To attach blade 10 to mold M, blade 10 is inserted within a slot 30 formed in mold M.

Figure 3:
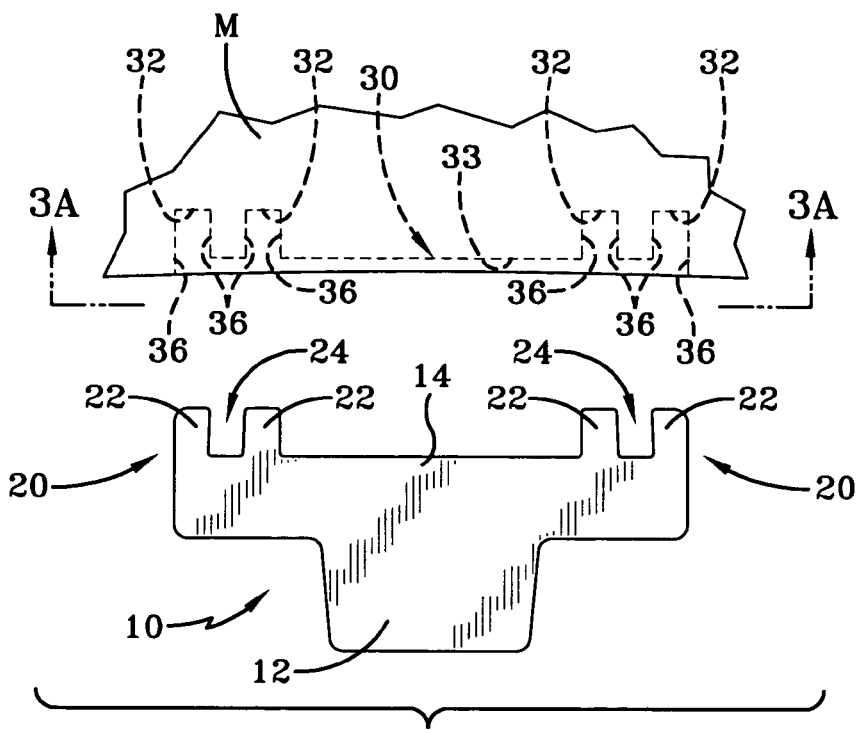
FIG. 3 is a partially schematic front assembly view depicting insertion of the blade into a slot formed in a tire mold according to the concepts of the present invention.
Figure 3A:
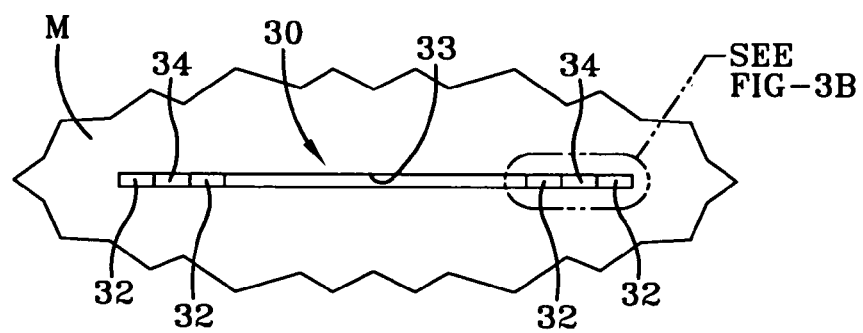
FIG. 3A is a top plan view of a slot according to the concepts of the present invention.
Figure 3B:
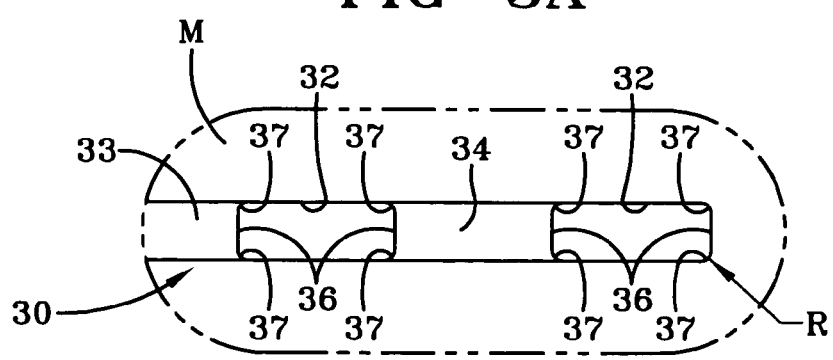
FIG. 3B is an enlarged view of a portion of the slot depicted in FIG. 3A.

In accordance with the concepts of the present invention the tire mold system includes a slot 30 formed within mold M that holds blade 10. To that end, slot 30 includes a receiver, generally indicated by the number 31 that receives the attachment assembly 20. Receiver 31 generally conforms to attachment assembly 20. For example as shown in FIGS. 3-3B, receiver 31 includes a pair of recesses 32 that receive a pair of prongs 22 separated by a protruding bridge 34. If blade 10 includes multiple attachment assemblies 20, slot 30 may be formed with corresponding receivers 31, as shown in FIGS. 3 and 3A. To provide additional Support slot 30 may include a shallow recess 33 for receiving a portion of base 14 that lies adjacent to the attachment assemblies 20. For example, with attachment assemblies 20 located at the ends of blade 10, the center section of the blade's base 14 may be received in a central recess 33. Advantageously, since attachment assemblies 20 hold the blade, recess 33 does not have to be machined to the full depth of receivers 31 to provide the necessary support. This saves considerable time, material, and tool wear in machining slots 30.

The outer walls 36 of receiver 31 may be cut straight, meaning without an undercut. For example, as shown, the walls may be perpendicular to the top surface of mold M. When compared to the undercut walls found in the prior art, using straight cut walls greatly reduces the complexity of machining slot 30 and allows the use of electronic discharge machining (EDM).

Figure 4A:
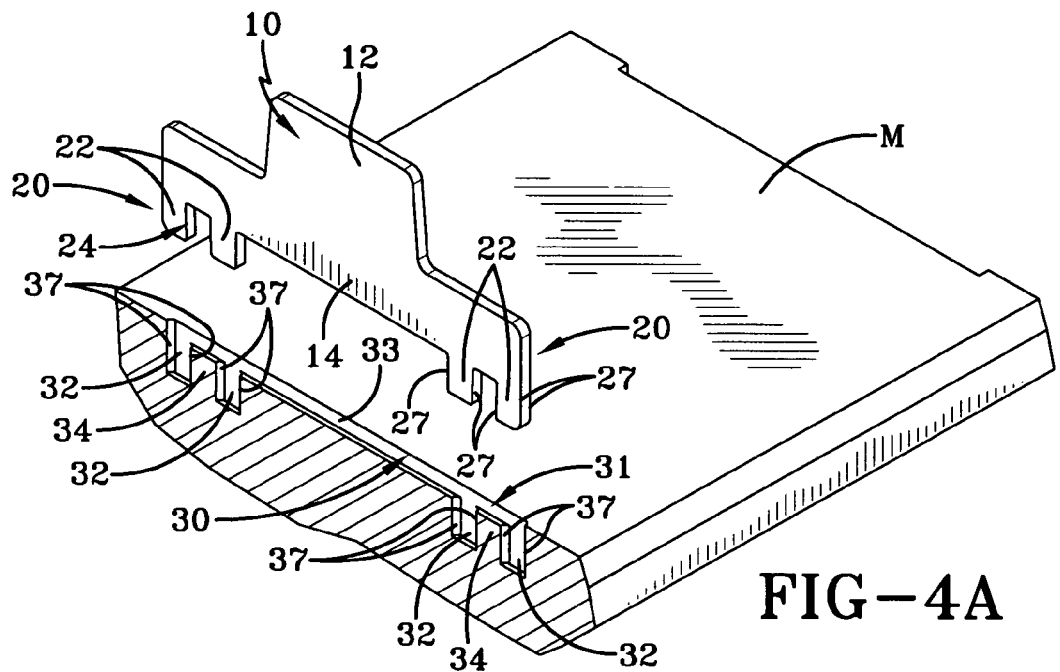
FIG. 4A is a perspective view of a tire blade system including a blade having a pair of attachment assemblies being inserted into a slot having corresponding receivers with rounded corners.
Figure 4B:
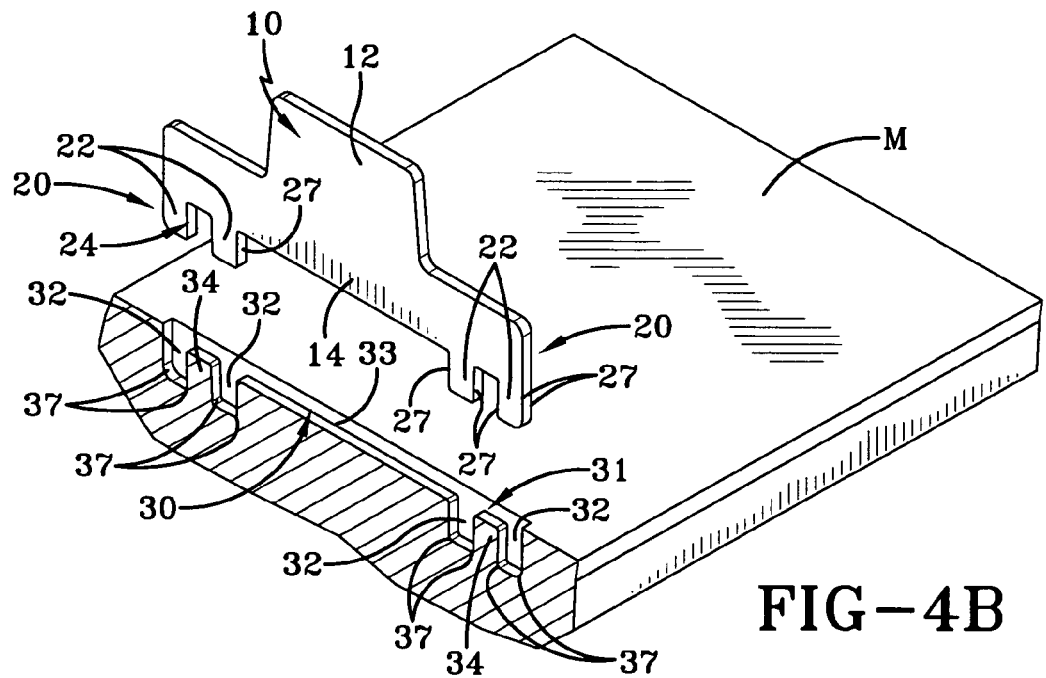
FIG. 4B is a perspective view similar to FIG. 4A, depicting the receivers after the blade has been inserted, where the corners of the receiver have been deformed by the square corners of the blade.

In general, attachment assembly 20 creates an interference fit with receiver 31 by locally deforming receiver 31. To that end, attachment assembly 20 includes at least one surface adapted to deform receiver 31 upon insertion of blade 10 in a slot 30. In one embodiment of the invention, the cross-section of attachment assembly 20 is made larger than the cross-section of the corresponding receiver 31 to create an interference fit. For example, as shown in FIGS. 3B-4B, the corners 27 of attachment assembly 20 are made square, while the corners 37 of receiver 31 are rounded (FIG. 3B). By rounding one or more corners 37, the cross-section of attachment assembly 20 having square corners 27 is larger than its corresponding receiver 31. By applying a radius R to at least one of the corners 37 of recesses 32, when the blade 10 is inserted, prongs 22 deform the corners 37 of recesses 32. FIG. 4A shows the radiused corners 37 of receivers 31 before blade 10 is inserted, and FIG. 4B shows the resulting deformation after insertion. The difference in cross section between attachment assembly 20 and receiver 31 creates an interference fit that helps hold blade 10 against pulling forces within mold M. This method of attaching blade 10 may be used as a separate method of attaching blade 10 or in combination with the engaging edge method described below.

Alternatively, attachment assemblies 20 may create an interference fit with mold M by deforming a bridge 34 within mold M. For example, as best shown in FIG. 2, an engaging edge 38 on prong 22A may be provided on one side of notch 24, and an undercut edge 40 may be provided on a second prong 22B on the opposite side of notch 24. It will be understood that the undercut is formed by opening undercut edge 40 interiorly of the mouth 25 of notch 24. In effect the material of the undercut prong 22B forms an overhanging portion at the mouth that interferes with outward movement of blade 10 relative to mold M after it is attached, as described more completely below.

Engaging edge 38 is adapted to force bridge 34 toward undercut edge 40 as blade 10 is inserted into slot 30. Any shape suitable for forcing bridge 34 toward undercut edge 40 may be used. In the example shown, engaging edge 38 slopes inward at an angle α, relative to bottom face 41 of prong 22, as it extends inward toward floor 42 of notch 24. Likewise, undercut edge 40 may have any shape so long as it opens inward of the edge 44 formed at the juncture of bottom face 41 and undercut edge 40 of prong 22. In this way, as the bridge 34 is pushed into the open area (seen between the dashed line and surface 40 in FIG. 2), it is partially trapped by the outer edge 44 of prong 22. In the example shown, undercut edge 40 slopes at an angle β, relative to bottom face 41 of prong 22. Angle β may be equal to angle α such that the engaging edge 38 and undercut edge 40 are parallel. These angles, however, do not have to be equal, and may vary relative to each other. As depicted by the dashed lines in FIG. 2, in this example, undercut edge 40 opens notch 24 laterally the same extent that engaging edge protrudes into notch 24. It has been found that increasing the angle of engaging edge 38 and undercut edge 40 increases the force needed to pull the blade 10 from slot 30. Suitable angles, i.e. those resulting in pull out forces within the range typically experienced in tire molds, included absolute angles from greater than zero degrees to about 7.5 degrees. It is expected that angles above 7.5 degrees would result in higher pull out forces, and thus would be suitable as well. Consequently, any angle other than perpendicular, measured relative to the bottom face 41, is believed to be suitable.

The outer edges 43 of prongs 22 are cut straight or perpendicular to bottom face 41 to facilitate insertion of prongs 22 into straight cut recesses 32. As mentioned above, using straight cut recesses 32 greatly reduces the complexity of machining mold M by avoiding the use of undercut slots in a machined mold.

It is believed that the attachment assembly 20 described above would be effective in a cast mold. When forming the cast mold, molten material would flow around prongs 22 and into the open space defined by undercut edge 40 such that the same interference fit between attachment prongs 22A, 22B and bridge 34 would be created during the molding process. Consequently, a blade 10 having such an attachment assembly 20 could be used in both a machined mold and a cast mold.

Figure 5A:
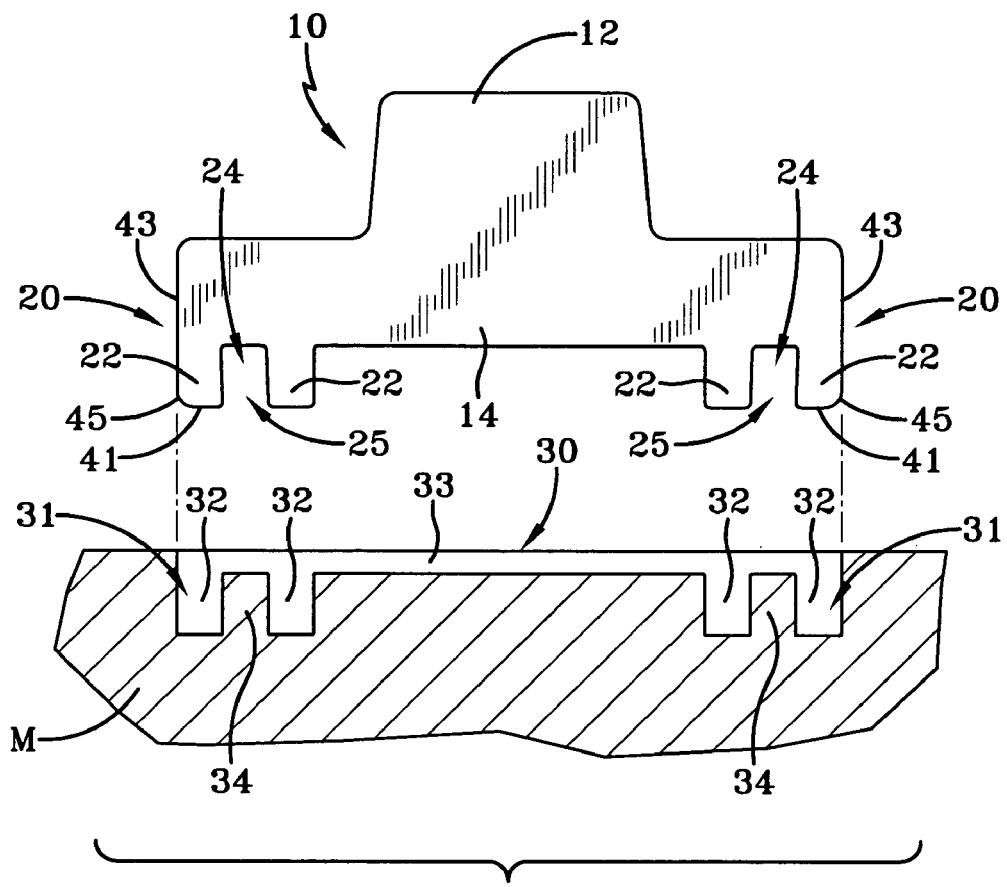
FIG. 5A is a front elevational view of a tire blade system, partially sectioned to show details of the insertion of the blade into the slot formed in the tire mold, where the outer prongs have been rounded to facilitate insertion.
Figure 5B:
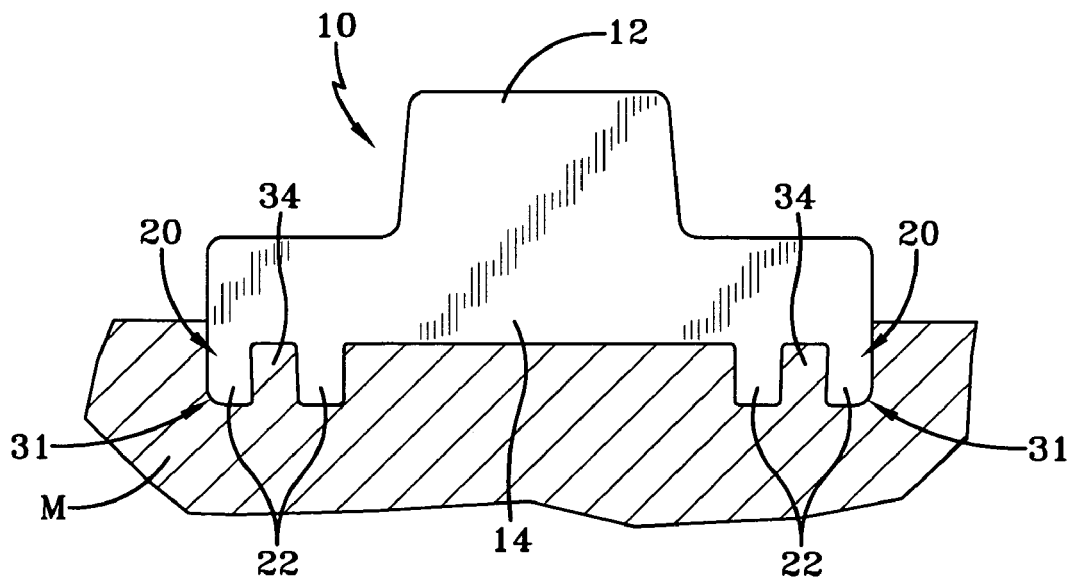
FIG. 5B is a front elevational view similar to FIG. 5A showing the blade inserted.

Optionally, as shown in FIG. 5A, one or more edges of prongs 22 may be rounded or beveled to ease insertion of blade 10 into slot 30. For example, the outside corner 45 formed between bottom face 41 and outer edge 43 of the outermost prongs 22 on blade 10 may be rounded to help locate blade 10 in slot 30 and facilitate its insertion. Blade 10 may be inserted in any known manner including simply pressing blade 10 inward until attachment assemblies 20 are seated within receivers 31 (FIG. 5B). If necessary, blade 10 may be tapped into slot 30 with a hammer or other suitable object, as is known in the art. Or when using blade 10 in a cast mold, blade 10 having an attachment assembly 20 is held in a pattern while molten molding material fills the mold. The molten material flows around attachment assembly 20 and is allowed to cool and harden. Once hardened, the pattern is removed and blade 10 is held within the completed mold. In both cases, the interference fit established by attachment assembly 20 holds blade 10 against the pulling forces created during the tire molding process.

It should be apparent that the invention as described provides comports with patent statutes by providing a new and useful self-locking tire blade system. It should further be understood that the preceding is merely a detailed description of a preferred embodiment of this invention and that various modifications and equivalents can be made without departing from the spirit or scope of the invention. The preceding description, therefore, is not meant to limit the scope of the invention. Rather, the scope of the invention is to be determined by the appended claims and their equivalents.

The invention claimed is:

1. A self-locking tire blade system comprising:
   a tire mold defining at least one slot, said slot defining a first recess and a second recess spaced by a bridge, the walls of said first and second recess being straight;
   a blade including a body exposed within said tire mold and an attachment assembly received in said slot, said attachment assembly including a first and a second prong spaced by a notch; and
   wherein said first prong includes an engaging edge and said second prong including an undercut edge, and when said blade is inserted into said slot, said engaging edge deflects said bridge toward said undercut edge to resiliently hold said blade in said slot.

2. The self-locking tire blade system according to claim 1 wherein said walls of said first and said second recess are perpendicular to said bridge.

3. The self-locking tire blade system according to claim 1 wherein said first prong includes an outside edge, opposed from said engaging edge and said second prong includes an outside edge opposed from said undercut edge, said first and said second prong outside edges being perpendicular relative to said bridge.

4. The self-locking tire blade system according to claim 3 wherein said engaging edge is disposed at an angle relative to said first prong outside edge and said undercut edge is disposed at an angle relative to said second prong outside edge.

5. The self-locking tire blade system according to claim 3 wherein said engaging edge and said undercut edge are parallel.

6. A self-locking blade for attachment to a tire mold comprising:
   a body; and
   a first prong and a second prong extending from a base of said body, each prong terminating in a bottom face, said prongs being laterally spaced relative to each other and to define a notch therebetween, said first prong including an engaging edge, facing said second prong and said second prong including an undercut edge, facing said first prong, said engaging edge and said undercut edge being generally parallel and oriented other than perpendicular to said bottom face.

7. A self-locking blade according to claim 6 wherein the first prong includes an outside edge, opposed from said engaging edge, and said second prong includes an outside edge opposed from said undercut edge, wherein said first prong outside edge and said second prong outside edge extend substantially perpendicular to said bottom face.

8. A self-locking blade according to claim 7, wherein an outside corner formed by said outside edge and said bottom face of at least one prong is rounded to facilitate insertion of said blade.

9. A self-locking blade according to claim 6 wherein a third and a fourth prong are provided that are structurally the same as said first and said second prongs and positioned on an opposed end of said bottom edge.

10. A self-locking tire blade system comprising:
    a tire blade having an attachment assembly extending from a base of said tire blade, said attachment assembly including at least one prong having a width less than the length of said tire blade;
    a tire mold having a receiver, said receiver defining a recess corresponding to said prong; and
    wherein said attachment assembly has a surface adapted to deform said receiver upon insertion to create an interference fit between said tire blade and said tire mold.

11. The self-locking tire blade system of claim 10, wherein said attachment assembly has a cross section and said receiver has a cross section, wherein said cross section of said attachment assembly is larger than said cross section of said receiver to create said interference fit.

12. The self-locking blade system of claim 11, wherein said cross section of said receiver has rounded corners, and said cross section of said attachment assembly has square corners, wherein said square corners of said attachment assembly displace the material in said rounded corners of said receiver to create the interference fit.

13. The self-locking tire blade system of claim 10, wherein said attachment assembly includes a second prong, said prongs defining a notch therebetween and said receiver defines a pair of recesses corresponding to said prongs separated by a bridge, wherein one of said prongs has an undercut surface adjacent said notch and the other of said prongs has an engaging surface on an opposite side of said notch, wherein said engaging surface is adapted to deform said bridge into said undercut surface to create the interference fit.

14. The self-locking tire blade system of claim 13, wherein said prongs have a bottom face and said engaging surface and said undercut surface slope at a parallel angle relative to said bottom faces.

15. The self-locking tire blade system of claim 14, wherein said angle is in a range from greater than 0 degrees to about 7.5 degrees.

* * * * *